(12) United States Patent
Beardow et al.

(10) Patent No.: US 10,326,714 B2
(45) Date of Patent: Jun. 18, 2019

(54) INSTANT MESSAGING WITH NON SUBSCRIBER USERS

(71) Applicant: Orange, Paris (FR)

(72) Inventors: Paul Beardow, Easten Somerset (GB); Romain Pabot, Paris (FR); Giles Corbett, London (GB)

(73) Assignee: ORANGE, Paris (FR)

( * ) Notice: Subject to any disclaimer, the term of this patent is extended or adjusted under 35 U.S.C. 154(b) by 115 days.

(21) Appl. No.: 15/119,027

(22) PCT Filed: Feb. 13, 2015

(86) PCT No.: PCT/EP2015/053161
§ 371 (c)(1),
(2) Date: Aug. 15, 2016

(87) PCT Pub. No.: WO2015/121453
PCT Pub. Date: Aug. 20, 2015

(65) Prior Publication Data
US 2016/0359774 A1 Dec. 8, 2016

(30) Foreign Application Priority Data
Feb. 14, 2014 (EP) .................................... 14305206

(51) Int. Cl.
*H04L 12/58* (2006.01)
(52) U.S. Cl.
CPC .............. *H04L 51/04* (2013.01); *H04L 51/28* (2013.01); *H04L 51/02* (2013.01)
(58) Field of Classification Search
CPC ......... H04L 51/04–51/28; H04L 65/00–65/80; H04L 47/00–47/829
See application file for complete search history.

(56) References Cited

U.S. PATENT DOCUMENTS

2002/0006803 A1   1/2002  Mendiola et al.
2005/0086068 A1*  4/2005  Quigley .............. G06Q 20/206
                                          705/44

(Continued)

FOREIGN PATENT DOCUMENTS

EP        1075119 A2    2/2001
KR      101180765 A     9/2012

OTHER PUBLICATIONS

International Search Report and Written Opinion dated May 8, 2015, for corresponding International Application No. PCT/EP2015/053161, filed Feb. 13, 2015.

*Primary Examiner* — Clayton R Williams
(74) *Attorney, Agent, or Firm* — David D. Brush; Westman, Champlin & Koehler, P.A.

(57) ABSTRACT

A method of establishing a communication through an instant messaging IM service, between a first device and a second device. The method includes the following acts carried out by a server: receiving from the first device a first request for establishing an IM conversation with the second device, the request comprising an identifier of a user of the second device; generating a uniform resource locator URL, including information corresponding to the identifier, the URL being associated with a webpage comprising an IM interface displayable by a browser of the second device; receiving a second request from the browser to access the URL; and upon receiving conversation messages from the first and the second device and, if the access to the virtual account has been provided, pushing these messages through the IM service.

14 Claims, 6 Drawing Sheets

(56) References Cited

U.S. PATENT DOCUMENTS

| | | | |
|---|---|---|---|
| 2006/0026237 A1* | 2/2006 | Wang | H04L 51/04 709/206 |
| 2006/0271688 A1* | 11/2006 | Viger | H04L 63/101 709/227 |
| 2008/0134343 A1 | 6/2008 | Pennington et al. | |
| 2009/0320109 A1* | 12/2009 | Salada | G06Q 10/107 726/6 |
| 2010/0210244 A1* | 8/2010 | Andreasson | H04L 51/18 455/412.1 |
| 2014/0074941 A1* | 3/2014 | He | H04L 51/046 709/206 |
| 2014/0136846 A1* | 5/2014 | Kitze | H04L 67/2814 713/170 |
| 2014/0337954 A1* | 11/2014 | Ahmed | G06F 21/41 726/8 |

* cited by examiner

INSTANT MESSAGING WITH NON SUBSCRIBER USERS

CROSS-REFERENCE TO RELATED APPLICATIONS

This Application is a Section 371 National Stage Application of International Application No. PCT/EP2015/053161, filed Feb. 13, 2015, the content of which is incorporated herein by reference in its entirety, and published as WO 2015/121453 on Aug. 20, 2015, in English.

FIELD OF THE DISCLOSURE

The present invention relates to the field of instant messaging over the internet.

It finds applications, in particular while not exclusively, in dedicated application designed for instant messaging embedded in mobile terminals or in personal computers.

BACKGROUND OF THE DISCLOSURE

The term "instant messaging (IM)" refers to any kind of exchange of messages over the Internet. For example, such message can comprise text, pictures, movies, etc. These exchanges can be managed by various types of protocols, such as "Internet Relay Chat" (IRC), AOL® instant Messenger (AIM), Adium, Facebook® chat, etc.

The term "dedicated application" refers to any kind of software application that provides instant messaging features. For example, an application can be a mobile app such as BBM®, Libon®, Skype®, Kik®, etc. This application can also be a computer software (such as Microsoft® Messenger, Skype®, etc.).

A widespread method to exchange messages over the internet requires users to download dedicated applications and to create subscriber accounts. Once the application is downloaded and installed, users log in the application using the subscriber account. A list of contacts is then displayed and the user can start exchanging messages with these contacts. These contacts refer to other users that have also downloaded the application and created a subscriber account.

Therefore, with this method, two users wishing to exchange messages need to download the same application. However, several applications are proposed on the Internet. Thus, the user can have friends using different applications and therefore needs to download several applications to be able to exchange messages with all his friends. Downloading several applications is not convenient for the user as it is time consuming and as it requires a lot of memory space in the user's device.

Applications embedded in browsers have been proposed to free users from downloading applications.

However, such web applications still require users to be logged with a subscriber account. Thus, a first user logged with a subscriber account can't directly communicate with a second user who has no subscriber account. In this case, the first user has to send a message, using a conventional mean such as short message service (SMS) or email, to ask the second user to create a subscriber account. Creating a subscriber account is long and inconvenient for the second user, especially when he is using a mobile device. Indeed, mobile devices can have small screens and inconstant network connection, which makes it particularly hard to fill a form in order to create a subscriber account.

SUMMARY

To address these needs, a first aspect of the invention relates to a method of establishing a communication through an instant messaging IM service, between a first device and a second device, the method comprising the following steps carried out by a server:

receiving from the first device a first request for establishing an IM conversation with the second device, the request comprising an identifier of a user of the second device, verifying, on the basis of the identifier, whether a virtual account for the identifier exists, and if not, generating a virtual account for the identifier, generating a uniform resource locator URL, including information corresponding to the identifier, the URL being associated with a webpage comprising an IM interface displayable by a browser of the second device, receiving a second request from the browser to access the URL, providing access to the virtual account for the second device, and receiving conversation messages from the first and the second device and, if the access to the virtual account has been provided, pushing these messages through the IM service.

Thus, the communication is established even if the user of the second device does not have subscribed to an account. Indeed, retrieving or generating the virtual account is directly done by the server, without any intervention from the user of the second device. From the user of the second device perspective, the communication is directly established without any time-consuming and laborious account creation.

Moreover, if multiple devices invite a same unsubscribed user, the system links all invitations to the virtual account. Thus, one unique IM interface comprising all invitations and messages is provided for the unsubscribed user. Indeed, as the virtual account is linked to an identifier of the user of the second device, all further communications aimed at this identifier will be gathered in relation to the virtual account. Thus, even if the user of the second device has not subscribed to an account, a unique interface is provided with messages coming from multiple senders.

Making it possible for an unsubscribed user to access an IM service is particularly advantageous when devices are mobile terminals, such as smartphones. Indeed, conventional means (such as short messaging service SMS) to exchange messages can be expensive, for example in international communications. In this case, it is convenient to rely on an IM service without having to create a subscriber account.

When messages are pushed through the IM service, they are dispatched at least to the first and the second device. In some embodiments, messages pushed through the IM service are displayed in the IM interface. Thus, the user of the second device has an easy and convenient access to his IM messages.

In another embodiment, the first request further comprises a conversation message, this conversation message being pushed through the IM service if the access to the virtual account has been provided. Thus, the user of the first device can invite the user of the second device to establish the IM service and send a conversation message at the same time.

The term "browser" refers to any software enabling an interaction between a user and the Internet network. Such browser can be for example Chrome®, Firefox® OS, Tizen®, Internet Explorer® or Safari®. A browser can be running on a mobile device, on a personal computer, etc.

In a further embodiment, the URL includes information corresponding to an identifier of a user of the first device. Thus, the browser displaying messages in relation to a virtual account can specify accurate information concerning recipient of the communications.

In another embodiment, the access to the virtual account is provided by the server only if no previous request has been received in respect of the URL. Thus, the risk of misusing the URL is reduced. Indeed, the request to access the URL is sent quickly after the generation of the URL. Therefore, a malicious third party would have to intercept the URL just after this URL is generated, which is highly unlikely.

In still a further embodiment, access to the virtual account is provided only if the request is received during a predetermined period after the generation of the URL. The predetermined period can be fixed on the basis of the desired security level. A short period increases security but is less convenient for the user. A typical predetermined period is one to six months.

In another embodiment, messages sent and received by the user of the first device are stored in relation to a subscriber account of this user. Moreover, these messages are displayed on a dedicated application running on the first device only if the application is connected to the subscriber account.

Such applications make it possible to gather all communications linked with the subscriber account or with the virtual account. It provides a clear and convenient interface to manage communications and messages.

In another embodiment, the method further comprised generating an authorization code in relation to the virtual account and including the authorization code in the URL. Moreover, the access to the virtual account is provided only if the authorization code is received by the server. Thus, the server checks that the authorization code generated for this precise URL is identical with the one received when an access to the virtual account is requested. In this way, the URL is authenticated and the security of the establishment of the communication is improved.

In some embodiments, the method further comprises receiving a request to issue an access token for accessing the virtual account, the request comprising the authorization code, depending on the authorization code comprised in the request, issuing the access token. Moreover, the access to the virtual account is only provided if the access token is received by the server. Thus, security is improved as a further authentication step is required to access the virtual account.

In an embodiment, the access token is stored in relation to the browser running on the second device. Moreover, messages are sent or received from the browser running on the second device only if the access token is received by the server. Thus, the access to the virtual account is directly provided if the token is comprised in the browser. For example, if this user switches off the webpage comprising the IM interface in the browser to do something else, he can still directly access this webpage after a while as the token is still stored in relation to the browser.

In another embodiment, an identifier of the browser (such as the user agent of this browser) is sent along with the authorization code. The access to the virtual account is then provided if this identifier is received by the server. A further security measure is provided as a further authentication step is required.

In another embodiment, the method further comprises receiving a request from the second device to convert the virtual account into a subscriber account, converting the virtual account into a subscriber account, and registering an identifier of the user as a further identifier for the subscriber account. As all messages linked with the identifier are stored in relation to the virtual account, converting this virtual account to a subscriber account does not result in a loss of these messages. Thus, all messages are kept during the conversion.

In an embodiment, the step of transmitting the message including the URL includes either transmission of the message to the first device for forwarding on to the second device, or direct transmission of the message by the server to the second device.

A second aspect of the invention concerns a computer program product recorded on a storage medium and executable by a computer in the form of a software agent including at least one software module setup to implement the method according to any one of the embodiments of the first aspect of the invention.

A third aspect of the invention refers to a server establishing communication through an instant messaging IM service, between a first device and a second device, comprising:
  receiving means for receiving from the first device a first request for establishing an IM conversation with the second device, the request comprising an identifier of a user of the second device,
  processing means for:
    verifying, on the basis of the identifier, whether a virtual account for the identifier exists, and if not, generating a virtual account for the identifier,
    generating a uniform resource locator URL, including information corresponding to the identifier, the URL being associated with a webpage comprising an IM interface displayable by a browser of the second device,
  the receiving means being further intended to receiving a second request from the browser to access the URL and to receive conversation messages from the first and the second device, and
  the processing means being further intended to provide access to the virtual account for the second device and, if the access is provided, to push the messages through the IM service.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF ILLUSTRATIVE EMBODIMENTS

Figure 1:
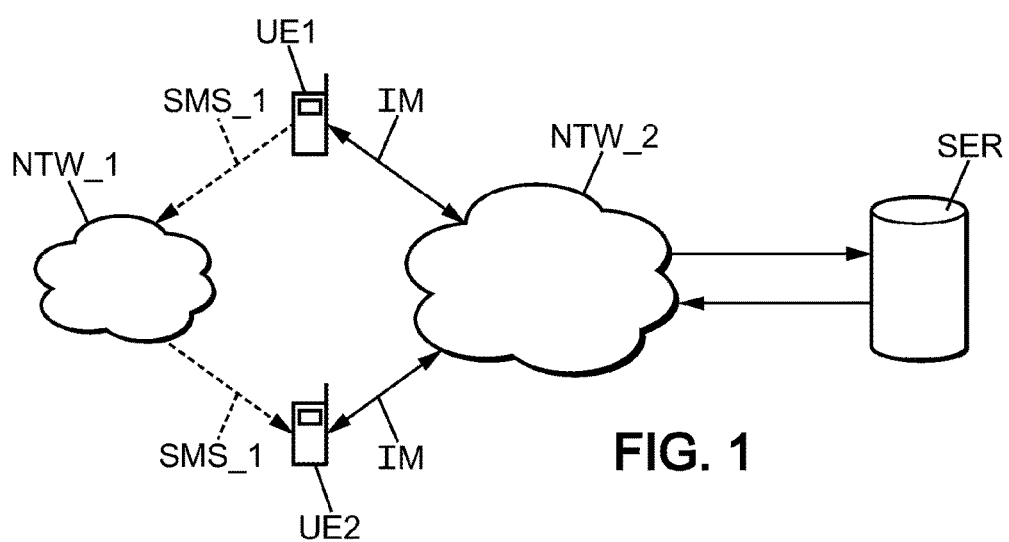
FIG. 1 represents a system for establishing communication between devices, according to some embodiments of the invention.

Referring to FIG. 1, there is shown a system for exchange of messages between a first device UE1 and a second device UE2 according to some embodiments. In this system, a short message SMS_1 comprising a Uniform Resource Locator (URL) is sent by the first device UE1 to the second device UE2. The URL comprises information for establishing an instant messaging communication over the Internet network NTW_2 between the two devices. In particular, this information relates to a virtual account created by a server SER to establish the communication. This server is also responsible for providing the IM service which enables the exchange of conversation messages between the two devices.

Prior to the establishment of the communication, a subscriber account is created by the user of the first device. This subscriber account is stored in the server SER and comprises information about the user of the first device (login, password for example) and information about contacts of the user of the first device. This information comprises the name of the contact and at least one identifier of the contact. Such identifier is for example the "Mobile Subscriber Integrated Services Digital Network-Number" (MSISDN) of a device of the contact, an email of the contact, a social network reference of the contact, etc. This subscriber account is then stored on the server SER. In one embodiment, a virtual account is directly created for each contact of the contact list, even if no request to send a message is sent by the user of the subscriber account.

Then, the user of the first device access his subscriber account by launching a dedicated application, a webpage comprising an IM interface on a browser or any kind of software able to provide instant messaging. A webpage comprising an IM interface is a web page comprising items and boxes to exchange messages over the Internet.

Figure 2:
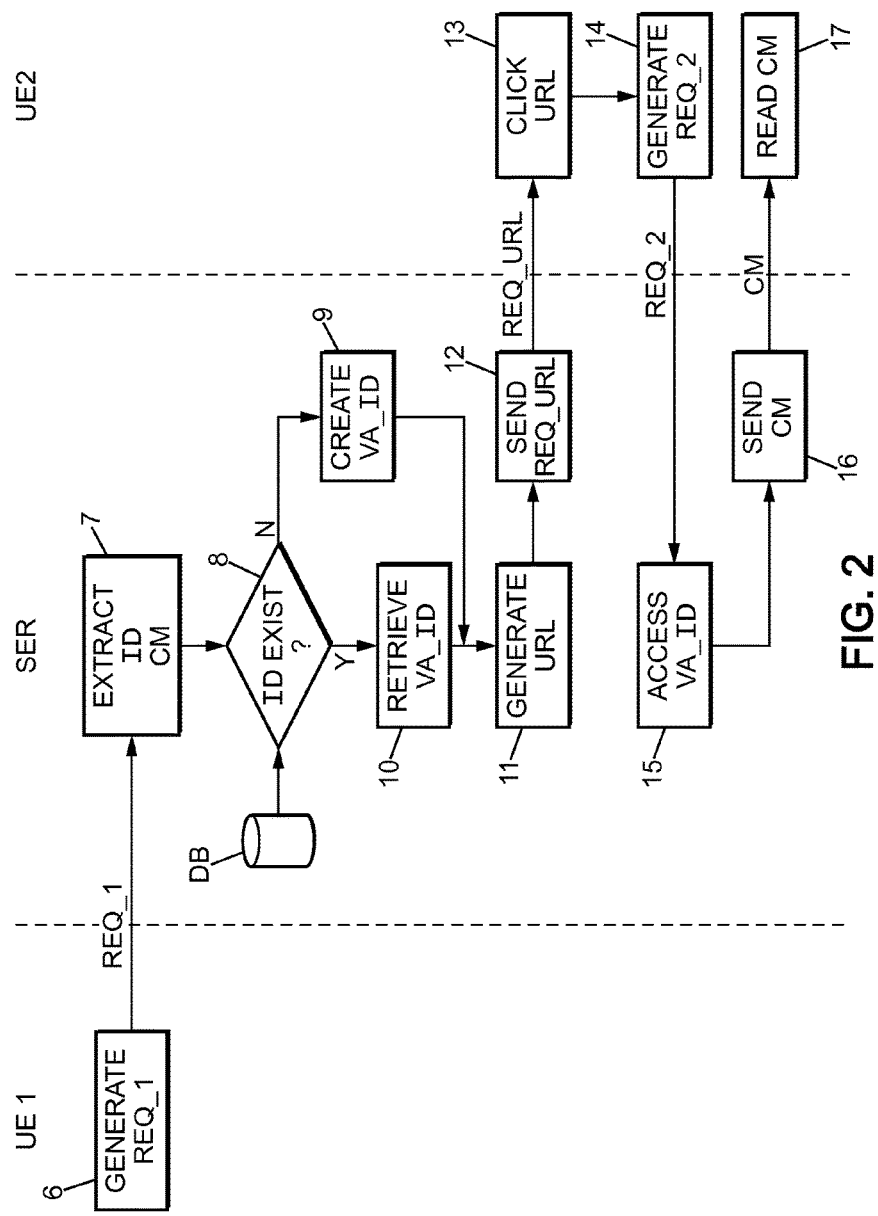
FIG. 2 represents a flowchart of the steps of a method according to some embodiments of the invention.

Once the user of the first device is logged to his subscriber account with the dedicated application, he is able to request establishment of a communication with the second device as it is presented hereafter in reference with FIG. 2.

At step 6, the user of the first device wants to send a message to one of his contacts or to a new contact. If he wants to send the message to a new contact, he is requested to precise an identifier for this contact. As mentioned above, this identifier is the Mobile Subscriber Integrated Services Digital Network-Number of the second device, the email of the user of the second device, etc. A request REQ_1 is then generated by the dedicated application. This request comprises an identifier ID of the user of the second device. The request further comprises a conversation message CM written by the user of the first device such as, for example: "Hi, are you still in New York?". Then, this request is transmitted to the server SER via the network NTW_2.

At step 7, at the server side, the identifier ID and the conversation message CM are extracted from the request REQ_1.

The identifier ID is confronted to a database DB of identifiers in test 8. This database comprises existing identifiers of subscriber and related subscriber accounts. Thus, this test makes it possible for the server to check if a (subscriber) account already exists for this identifier.

If an account does not already exists, i.e. the identifier ID does not correspond to an existing subscriber (account) of the IM service, a virtual account VA_ID is generated at step 9 as the subscriber account for the user of the second device. At this stage, the virtual account comprises the identifier ID and the conversation message CM is stored in relation to this virtual account. In particular, the conversation message is directly stored in a memory index of the database comprising the identifier and the conversation message or is stored in a remote database with a pointer to the virtual account stored in the database DB. For example, this virtual account is deleted if no activity concerning it has been detected over one year. Consequently, the virtual account may be seen as a temporary subscriber account for (the user of) the second device.

If an account already exists, information in relation with this account is retrieved from the database DB.

At step 11, the server generates a URL including information corresponding to the identifier. This information comprises a pointer to the virtual account. Alternatively, the information comprises the pointer to the virtual account, a pointer to the subscriber account of the user of the first device, an identifier of the first device and/or an identifier of the second device. Another alternative will be described hereafter in reference with FIG. 6. The URL is associated with a webpage comprising an IM interface displayable by a browser of the second device.

At step 12, a message REQ_URL comprising the URL and the conversation message CM is sent to the second device. Alternatively, the message REQ_URL only comprises the URL.

The message REQ_URL is directly sent by the server to the second device. Alternatively, the message REQ_URL is sent by the server to the first device and the first device forwards it to the second device. In this alternative, the message is sent by a conventional mean such as a short message service, SMS, by an email, by a social network message, etc. If the user of the second device does not want to use the IM service, he can still answer the message using the conventional mean.

Then the second device received the message REQ_URL comprising the URL. At step 13, the user of the second device opens the message REQ_URL and clicks on the URL. Clicking on the URL launches a browser (the default browser of the second device for example).

At step 14, a request REQ_2 to access the URL is generated by the browser. Alternatively, requests generated by the browser are generated by a remote "Web Page Server" (referenced by WS in FIG. 6). At this step, the webpage comprising the IM interface is not yet displayed in the browser. This request REQ_2 is then sent to the server.

Once the request is received by the server, access to the virtual account VA_ID is provided to the user of the second device at step 15. For example, such access is averagely provided in 7 seconds. The conversation message CM is then sent at step 16 to the second device.

At step 17, the conversation message CM is comprised in the webpage comprising the IM interface that is displayed by the browser.

Alternatively, a message comprising success acknowledgment and information for displaying the webpage comprising the IM interface with the conversation message CM are generated at step 14. This message is then sent to the second device and the webpage comprising the IM interface is displayed by the browser using this message.

Access to the virtual account is provided during a predetermined period after the request REQ_2 has been received. Typically, a one year period is granted for the user of the second device to have access to the virtual account. If access to the virtual account is lost, a new procedure for establishing the communication is done. For example, this new procedure is initiated by a subscriber inviting the user of the second device.

If the access to the virtual account is provided, the user of the second device can send and receive conversation message from the first device through the IM service. Indeed, when the access to the virtual account is provided, these messages are pushed through the IM service. Once they are pushed through the IM service; messages are displayed in the webpage comprising the IM interface on the browser of the second device and in the dedicated application of the first device.

The virtual account manages conversations with multiple devices. Thus, the IM interface makes it possible to switch between conversations.

Figure 3:
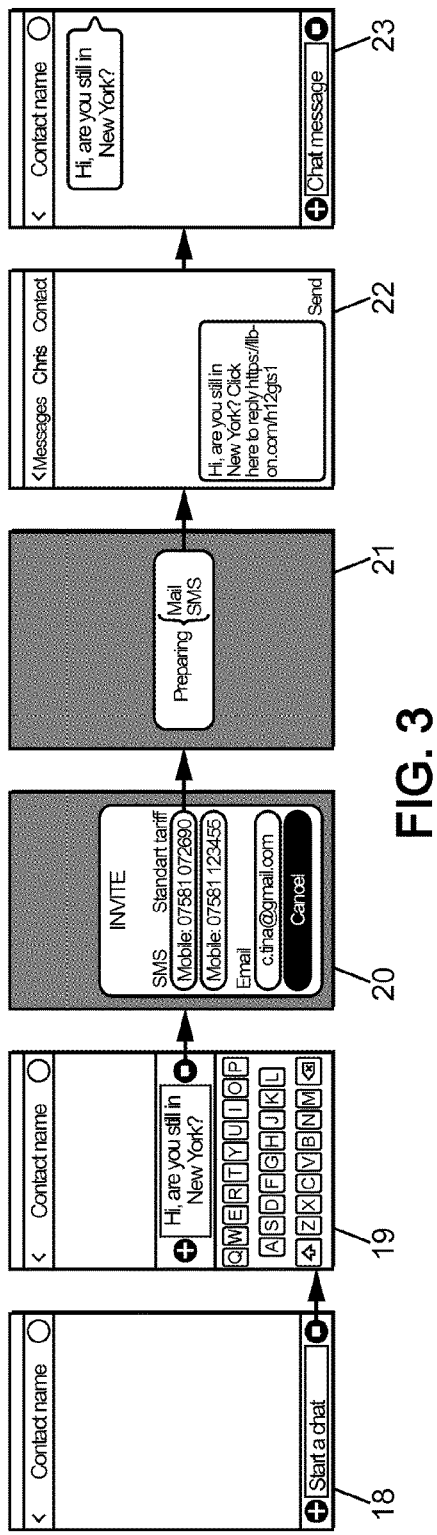
FIG. 3 represents screenshots of the first device, according to some embodiments of the invention.
Figure 4:
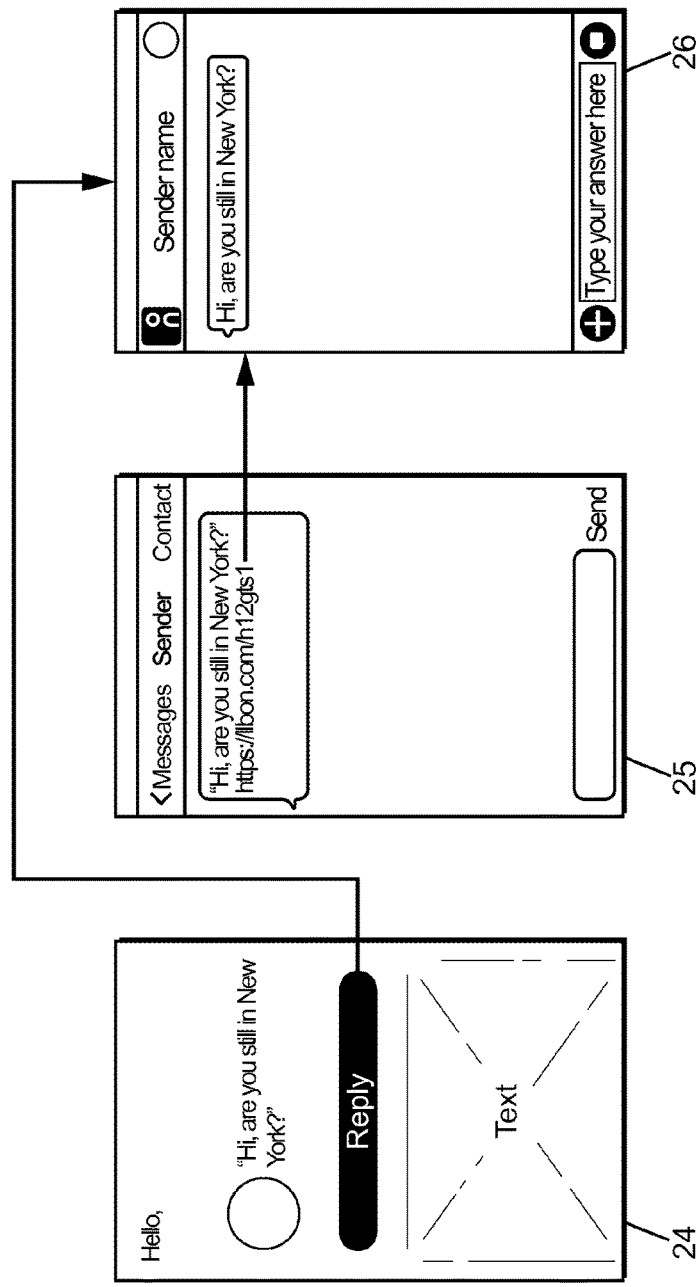
FIG. 4 represents screenshots of the second device, according to some embodiments of the invention.

The present invention is now illustrated by FIGS. 3 and 4, respectively presenting screenshots of the first device and the second device.

Once the user of the first device is logged to his subscriber account with the dedicated application, he selects a contact in his contact list. The application then displays a page 18 for establishing the communication. When clicking in the box intended to receive text, a keyboard is displayed for the user to write a message. In screenshot 19, the text: "Hi, are you still in New York?" is written. A page 20 inviting the user to choose a mean to send the message REQ_URL comprising the URL is displayed. The message is then prepared as shown in screenshot 21. The prepared message is forwarded to the application responsible for the transmission of the message REQ_URL. This application depends on the chosen mean to transmit the message (SMS, emails, as mentioned above). In screenshot 22, SMS has been chosen to transmit the message. After the SMS is sent, the message is displayed in the dedicated application as illustrated by screenshot 23.

Screenshot 24 of FIG. 4 represents the received email comprising the message REQ_URL. When the SMS way to transmit the message is chosen instead of the email, an SMS is received as presented in screenshot 25. When the user clicks on the URL displayed in the email or in the SMS, he is forwarded to a webpage 26 comprising the IM interface displayed by a browser of the second device. The conversation message "Hi, are you still in New York", is displayed in this webpage comprising the IM interface.

Figure 5:
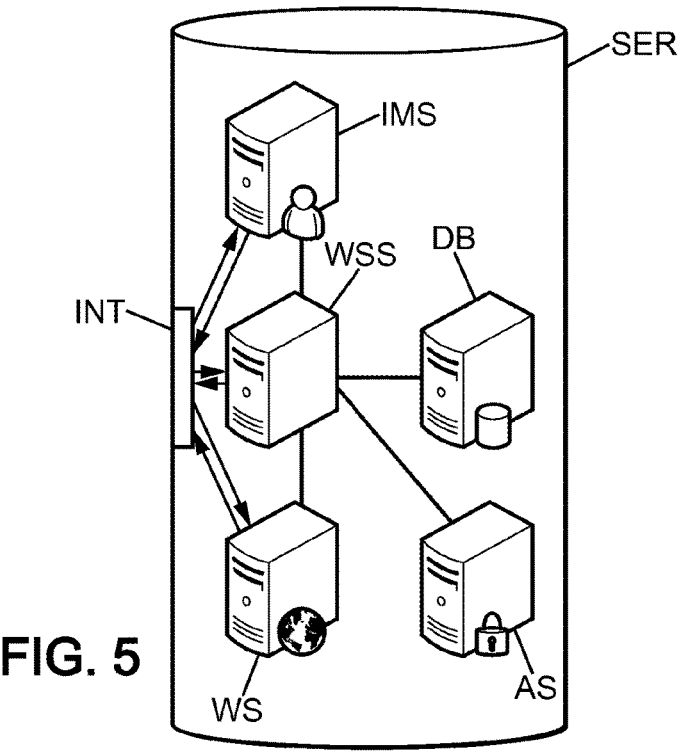
FIG. 5 represents a general server, according to some embodiments of the invention.

FIG. 5 illustrates a server consisting of a cluster of subservers. These subservers are regrouped in one physical device. Alternatively, they are located in independent devices and connected together. This cluster comprises:

a web services server WSS for processing steps relating to the establishment of the communication. This server provides application programming interfaces APIs that can be called from the dedicated application or from the webpage comprising the IM interface of the browser. These APIs are called via specially coded URLs that contain all of the information required for the call parameterised within the URL.

a database DB containing subscriber and virtual accounts of users and information stored in relation to these accounts. In one embodiment, virtual accounts are sub-accounts of the subscriber accounts. In this embodiment, a virtual account is generated for each contact of the contact list of the subscriber account comprising an identifier.

an instant messaging server IMS for forwarding messages when a communication is established. The instant messaging server provides the instant messaging service. In one embodiment, this is an Extensible Messaging and Presence Protocol (XMPP) based platform that is able to route messages between users and also store and forward them when users are not connected.

A web page server WS for generating webpages, notably the webpage comprising the IM interface, when they are requested by users. For example, this server returns HTML5 code to display the pages.

an authentication server AS for managing security issues. As it is presented hereafter in reference with FIG. 6, this server generates an authorization code in relation to a virtual account and an access token if the authorization code is well received at the authentication server level.

an interface INT to receive and transmit data in relation to the server SER.

In one embodiment, the web services server WSS is the only subserver to receive and send messages dedicated to the network NTW_2. Alternatively, the instant messaging server IMS, the web services server WSS and the webpage server WS are able to directly receive and send messages from the network NTW_2.

Figure 6:
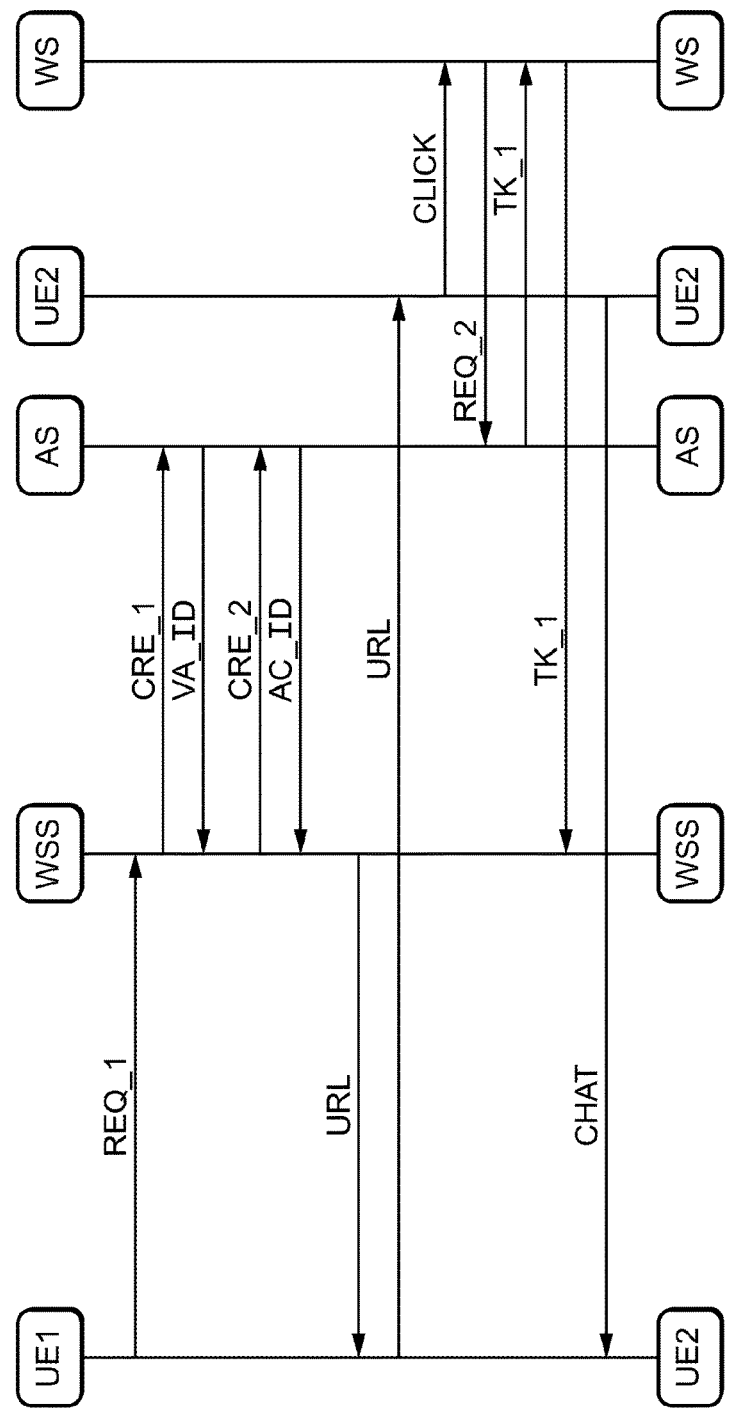
FIG. 6 represents a flowchart of the steps of a method according to some embodiments of the invention.

FIG. 6 is a flow chart describing a possible embodiment of the present invention. In this embodiment, security data are used to avoid any malicious use of the accounts by a third-party. Moreover, at least the web services server WSS and the webpage server WS directly receive and send messages from the network NTW_2.

A request REQ_1 is generated by the dedicated application running on the first device. The user of the first device has been previously logged to this application using his subscriber account. This message comprises an identifier ID of the user of the second device.

This request REQ_1 is received by the web services server WSS in order to generate a virtual account, as it was seen in steps 8 to 10 of FIG. 2. In particular, a first request CRE_1 for the generation of the virtual account VA_ID is sent to the authentication server AS if no account already exists for this identifier ID.

Once this virtual account is created or retrieved, a second request CRE_2 is sent to the authentication server for the generation of an authorization code AC_ID. The web services server WSS then generates a URL including information corresponding to the identifier. The information comprises the pointer to the virtual account, a pointer to the subscriber account of the user of the first device and the authorization code AC_ID.

Then, the URL is sent to the second device (via a transfer by the first device UE1) and the user of this device clicks on this URL. Clicking on the URL launches a browser which activates the webpage server WS. This webpage server then a request REQ_2 for the authentication server AS to issue an access token TK_2. The request comprises the authorization code and, based on this authorization code, the access token is issued or not. If it issued, it is stored in relation to the browser used to transmit the request REQ_2.

Using the access token TK_1, the webpage server WS then logs the user of the second device to his virtual account. If the access token is properly received, the communication is established between the two devices through the IM service.

Figure 7:
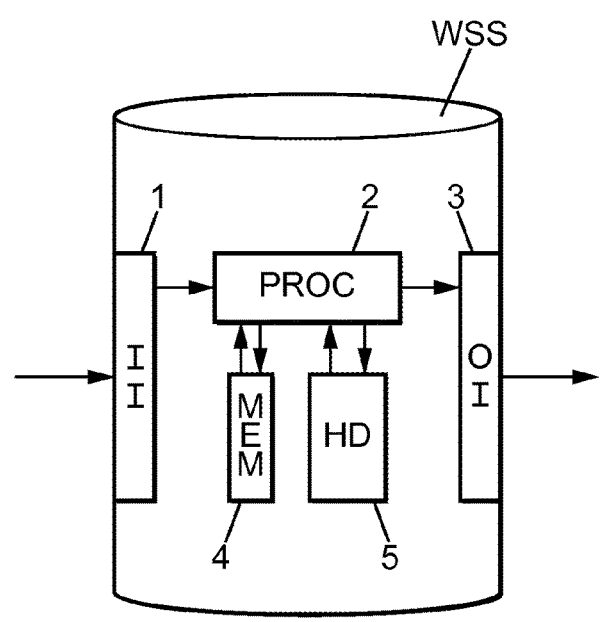
FIG. 7 represents a web services server, according to some embodiments of the invention.

FIG. 7 is a possible embodiment for a server that enables the present invention.

In this embodiment, the server WSS comprise a computer, this computer comprising a hard memory 5 to store program instructions loadable into a volatile memory 4 and adapted to cause circuit 2 to carry out the steps of the present invention when the program instructions are run by the circuit 2.

The memory 4 may also store data and useful information for carrying the steps of the present invention as described above.

The circuit 2 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising these instructions, or
- an electronic card wherein the steps of the invention are described within silicon.

This computer comprises an input interface 1 for the reception of data used for the above method according to the invention and an output interface 3 for providing a stacked model.

A person skilled in the art will readily appreciate that various parameters disclosed in the description may be modified and that various embodiments disclosed may be combined without departing from the scope of the invention.

In particular, the method according to some embodiments comprises steps where the user "clicks". Obviously, clicking is not limited to the action of a user on a mouse of a computer. It is meant by "clicking" all physical actions of interacting with the device such as touching a touchscreen, recording and analysing a sound, etc.

Although the present disclosure has been described with reference to one or more examples, workers skilled in the art will recognize that changes may be made in form and detail without departing from the scope of the disclosure and/or the appended claims.

The invention claimed is:

1. A method of establishing a communication through an instant messaging IM service, between a first device and a second device, the method comprising the following acts carried out by a server:
   receiving from the first device over at least one communication network a first request for establishing an IM conversation with the second device, the request comprising an identifier of a user of the second device,
   verifying, on the basis of the identifier, whether a subscriber account to the IM service exists for the identifier of the user of the second device, and if not, generating a virtual account for the identifier,
   after the verifying, generating a uniform resource locator URL, including information corresponding to the identifier of the user of the second device, the URL being associated with a webpage comprising an IM interface to the IM service displayable by a browser of the second device,
   sending the URL to the second device directly or through the first device over the at least one communication network,
   receiving a second request from the browser to access the URL over the at least one communication network, and
   upon receiving conversation messages from the first device and the second device, pushing these messages through the web page comprising the IM interface to the IM service without requiring the user of the second device to create a subscriber account to the IM service.

2. The method according to claim 1, further comprising after receiving a second request:
   providing access to the virtual account for the second device, the pushing of the messages through the IM service being carried out once access to the virtual account for the second device has been granted.

3. The method according to claim 1, wherein the first request further comprises a conversation message, said conversation message being pushed through the IM service if the access to the virtual account has been provided.

4. The method according to claim 1, wherein the URL further includes information corresponding to an identifier of a user of the first device.

5. The method according to claim 1, wherein access to the virtual account is provided only if the request is received during a predetermined period after the generation of the URL.

6. The method according to claim 1, wherein messages sent and received by the user of the first device are stored in relation to a subscriber account of this user, and wherein said messages are displayed on a dedicated application running on the first device only if the application is connected to the subscriber account.

7. The method according to claim 1, the method further comprising:
   generating an authorization code in relation to the virtual account;
   including the authorization code in the URL; and
   wherein the access to the virtual account is provided only if said authorization code is received by the server.

8. The method according to claim 7, the method further comprising:
   receiving a request to issue an access token for accessing the virtual account, said request comprising the authorization code;
   depending on the authorization code comprised in the request, issuing the access token; and
   wherein the access to the virtual account is provided only if the access token is received by the server.

9. The method according to claim 1, further comprising acts of:
   receiving a request from the second device to convert the virtual account into a subscriber account,
   converting the virtual account into a subscriber account, and
   registering an identifier of the user as a further identifier for the subscriber account.

10. The method according to claim 1, wherein a message including the URL is transmitted either;
    to the first device for forwarding to the second device, or
    by the server, to the second device.

11. A non-transitory computer readable storage medium, with a program stored thereon, said program comprising instructions for implementing a method of establishing a communication through an instant messaging IM service, between a first device and a second device, when the instructions are executed by a processor of a server, wherein the instructions configure the server to perform acts of:
    receiving from the first device over at least one communication network a first request for establishing an IM conversation with the second device, the request comprising an identifier of a user of the second device,
    verifying, on the basis of the identifier, whether a subscriber account to the IM service exists for the identifier of the user of the second device, and if not, generating a virtual account for the identifier, after the verifying, generating a uniform resource locator URL, including information corresponding to the identifier of the user of the second device, the URL being associated with a webpage comprising an IM interface to the IM service displayable by a browser of the second device, sending the URL to the second device directly or through the first device over the at least one communication network, receiving a second request from the browser to access the URL over the at least one communication network, and upon receiving conversation messages from the first device and the second device, pushing these messages through the web page comprising the IM interface to the IM service without requiring the user of the second device to create a subscriber account to the IM service.

12. A server establishing communication through an instant messaging IM service, between a first device and a second device, comprising:

a receiver for receiving from the first device over at least one communication network a first request for establishing an IM conversation with the second device, the request comprising an identifier of a user of the second device, a processor arranged to:
verify, on the basis of the identifier, whether a subscriber account to the IM service exists for the identifier of the user of the second device, and if not, generating a virtual account for the identifier, after the verifying, generate a uniform resource locator URL, including information corresponding to the identifier of the user of the second device, the URL being associated with a webpage comprising an IM interface to the IM service displayable by a browser of the second device, send the URL to the second device directly or through the first device over the at least one communication network, the receiver being further arranged to receive over the at least one communication network a second request from the browser to access the URL and to receive conversation messages from the first device and the second device, and the processor being further arranged to push the messages through the web page comprising the IM interface to the IM service without requiring the user of the second device to create a subscriber account to the IM service.

13. A method of establishing a communication through an instant messaging IM service, between a first device and a second device, the second device being associated with an identifier, the method comprising the following acts carried out by the second device:

receiving a uniform resource locator URL over at least one communication network from either a server or the first device, the URL being generated by the server and including information corresponding to a virtual account created by the server for the identifier associated with the second device, the URL being associated with an identifier of the first device and with a webpage comprising an IM interface to the IM service displayable by a browser of the second device, the second device having no subscriber account in the server for the IM service corresponding to the identifier associated with the second device, sending a request from the browser of the second device to the server to access the URL, and receiving and sending conversation messages from and to the first device through webpage comprising the IM interface to the IM service without requiring the user of the second device to create a subscriber account to the IM service.

14. A device for establishing a communication through an instant messaging IM service, between said device, hereinafter a recipient of the communication, and a different device, hereinafter an establisher of the communication, said recipient of the communication being associated with an identifier, the recipient of the communication comprising a processor arranged to:

receive a uniform resource locator URL over at least one communication network from either a server or the establisher of the communication, the URL being generated by the server and including information corresponding to a virtual account created by the server for the identifier associated with the recipient of the communication, the URL being associated with an identifier of the establisher of the communication and with a webpage comprising an IM interface for the IM service displayable by a browser of the recipient of the communication, the recipient of the communication having no subscriber account in the server for the IM service corresponding to the identifier associated with the recipient of the communication, send a request from the browser of the recipient of the communication to the server to access the URL, and receive and send conversation messages respectively from and to the establisher of the communication through webpage comprising the IM interface to the IM service without requiring a user of the recipient of the communication to create a subscriber account to the IM service.

* * * * *